Feb. 4, 1969  R. G. BOARD ET AL  3,425,645
RETRACTABLE SAFETY BELT APPARATUS AND THE LIKE
Filed Nov. 20, 1968

INVENTORS
RICHARD G. BOARD
NELSON H. SHAPIRO

BY *Shapiro and Shapiro*

ATTORNEYS

INVENTORS
RICHARD G. BOARD
NELSON H. SHAPIRO

BY *Shapiro and Shapiro*

ATTORNEYS

United States Patent Office 3,425,645
Patented Feb. 4, 1969

3,425,645
RETRACTABLE SAFETY BELT APPARATUS
AND THE LIKE
Richard G. Board, Bethesda, Md. (3000 Connecticut Ave., Washington, D.C. 20008), and Nelson H. Shapiro, Rockville, Md. (640 Washington Bldg., Washington, D.C. 20005)
Original application Nov. 5, 1964, Ser. No. 409,266. Divided and this application Nov. 20, 1968, Ser. No. 770,686
U.S. Cl. 242—107.2                    21 Claims
Int. Cl. B65h 75/48

ABSTRACT OF THE DISCLOSURE

Retractable safety belt unit including a retraction reel, a strap wound upon the reel, and means which normally prevents appreciable extension of the strap from the reel. The extension-preventing means is rendered inoperative when the strap is substantially fully wound upon the reel, is held inoperative during desired extension of the strap, and is thereafter rendered operative in response to slight strap retraction. The extension-preventing means permits retraction of the strap at all times. Means frictionally driven by the reel through a limited angular range in opposite directions holds the extension-preventing means inoperative during desired extensions of the strap and modifies the condition of the extension-preventing means to enhance substantial retraction of the strap.

Cross-references to related applications

This application is a division of Ser. No. 409,266, filed Nov. 5, 1964 for "Retractable Safety Belts", which itself discloses and claims subject matter disclosed in copending Ser. No. 377,344, filed June 23, 1964 for "Retractable Safety Belts", now Patent No. 3,289,970, granted Dec. 6, 1966.

Background of the invention

This invention relates to retractable safety belts and more particularly to so-called retractable seat belts for use in automotive vehicles.

The aforesaid Ser. No. 377,344 discloses and claims retractable seat belt apparatus in which a strap having a fastener member at a free end thereof may be grasped by the user and extended from a retraction device to place the strap in a user-restraining position, whereupon further extension of the strap is prevented automatically in response, for example, to the cessation of extending movement or to slight retracting movement of the strap. At the user-restraining position the strap may have any selected length within a wide range of lengths, so as to accommodate varying conditions of user size and clothing. The fastener member is engaged with a mating fastener member in order to complete the belt. When the fastener members are disengaged, the strap retracts automatically. The present application discloses and claims improvements and modifications in such apparatus and discloses and claims related apparatus.

Brief description of the invention

It is accordingly a principal object of the invention to provide improved retractable seat belt apparatus and the like.

A further object of the invention is to provide improved retractable seat belt apparatus in which a strap may be readily extended to any selected length within a wide range of lengths, locked automatically against further extension, and may be retracted automatically when released.

Another object of the invention is to provide improved apparatus for facilitating and enhancing the retraction of the strap.

Briefly stated, a preferred embodiment of the invention employs, in conjunction with a strap wound upon a conventional spring-motivated retraction reel, a lock to prevent undesired extension of the strap from the reel, the lock being automatically rendered inoperative when the strap has been substantially fully retracted upon the reel. The invention employs means frictionally driven from the reel through a limited angular range for maintaining the lock inoperative during desired extension of the strap from the reel and which renders the lock operative to prevent further extension of the strap after the strap has been extended to the desired length. The invention further includes means frictionally driven from the reel through a limited angular range to open the lock wide during rewinding of the strap upon the reel.

Brief description of the drawings

The invention will be further described in conjunction with the accompanying drawings, which illustrate preferred and exemplary embodiments, and wherein.

Detailed description of the invention

Figure 1:
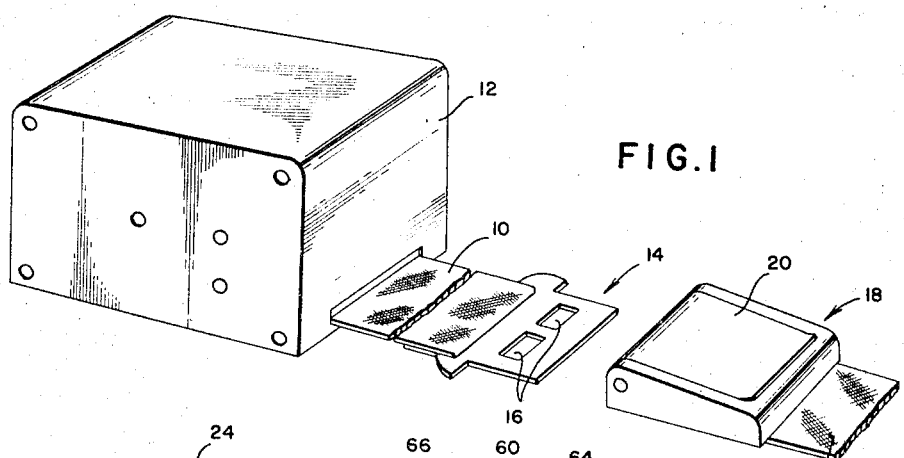
FIGURE 1 is a perspective view illustrating the external appearance of housing, strap, and fastener components of a typical embodiment of retractable seat belt apparatus in accordance with the invention.

Referring to the drawings, as shown in FIGURE 1 a retractable seat belt unit of the invention may comprise a strap 10 of suitable material, such as nylon webbing, adapted to be extended from a housing 12 and to be retracted into the housing. The housing may be supported upon the floor of a vehicle in any convenient orientation, at one side of a seat, or if the seat is strongly anchored to the floor, the housing may be supported directly upon the seat. A free end of strap 10 is provided with a fastener member 14, which in the form shown is a conventional tongue having openings 16. The tongue is adapted to engage a mating fastener member 18, such as a conventional buckle into which the tongue is inserted to complete the belt. As is well known in the art, when the tongue is inserted into the buckle, abutments of the buckle enter the openings 16 of the tongue to retain the fastener members in engagement until a release element, such as a pivoting lever 20, is operated. Buckle 18 may be connected to another strap 22, the remote end of which (not shown) may be anchored to the floor (or to the seat) at the opposite side of the seat. Under appropriate circumstances strap 22 may be dispensed with and the mating fastener member 18 may be supported directly upon the seat or otherwise anchored to the floor.

In accordance with the invention it is desired that the strap be readily extensible from the housing 12 to place the strap in a user-restraining position, then be locked against further extension automatically, and finally be readily retracted into the housing when released. Moreover, it is desired that strap 10 be capable of being extended to any desired length within a wide range of lengths and then locked against further extension, so that all adjustments in length to accommodate different size of users and different clothing conditions may be made merely by extending the strap 10 to the desired length. Strap 22 may then be kept very short or may be eliminated as indicated above.

Figure 2:
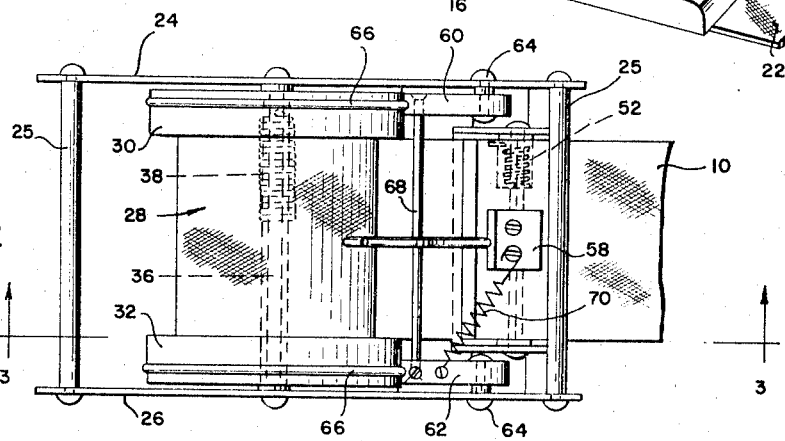
FIGURE 2 is a plan view illustrating one embodiment of the apparatus which may be contained within the housing shown in FIGURE 1.

FIGURES 2–5 illustrate one embodiment of a simple apparatus which may be employed in the housing 12 in order to accomplish the foregoing purposes. As shown in FIGURE 2, a frame comprising a pair of side plates 24 and 26 supports a retraction reel 28. The frame may be secured to or from part of the housing and should be anchored to the floor or, under appropriate circumstances, to the seat. The reel comprises a pair of end discs 30 and 32 joined by a sleeve hub 34, the end discs being provided with suitable bearings, as is well known in the art, for rotatably supporting the reel upon a pin 36 which extends through the sleeve hub with substantial space therebetween. A spring motor for winding the reel may comprise a helical torsion spring 38 which is slipped over the pin 36 with substantial free play. One end of the spring may be secured to an end disc or the sleeve hub and the other end of the spring secured to the pin 36, so that the spring is wound or unwound as the reel is turned relative to the pin. Other well known types of retraction reels may also be employed. Strap 10 has its end remote from fastener member 14 attached to the hub of the reel so that the strap may be wound upon the reel by the reel spring for retraction and may be extended from the reel while winding the spring. In the illustrative form shown the strap is trained from the bottom of the reel.

Figure 5:
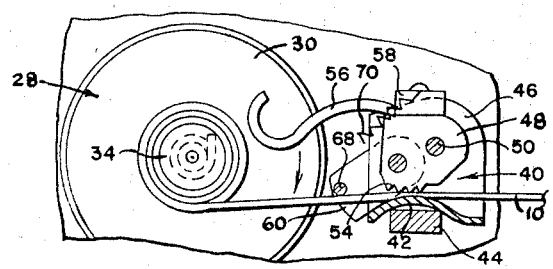
FIGURE 5 is a similar sectional view illustrating still another condition of the apparatus.

In order to prevent undesired extension of the strap from the reel when the belt is in use, a suitable extension-preventing means or lock is employed. In the illustrative form shown the lock comprises a clamp 40. The clamp has a convexly contoured clamping plate 42 supported by a cross bar 44 between the side plates 24 and 26. Plate 42 has a pair of side members 46 which, along with plate 42, constitute a yoke for supporting a pivoting clamp member 48. Clamp member 48 is supported upon a pin 50 extending between the side members. A torsion spring 52 received within a bore at one end of the pivoting clamp member, and having its respective ends connected to one of the side members 46 and to the pivoting clamp member, biases the pivoting clamp member toward a position at which a clamping surface 54 clamps the strap 10 against plate 42 as shown in FIGURE 5, and thus the extension-preventing means is normally operative to prevent strap extension. The clamping surface may turn toward or away from member 42 and may be roughened, knurled, or longitudinally grooved so as to promote the clamping action, as is well known in the art. Clamping surface 54 is shaped so as to increase the clamping pressure in repsonse to a pull tending to extend the strap. This is accomplished by suitably shaping clamping surface, as by making the trailing edge of the clamping surface a greater distance from the pivot 50 than the leading edge. The clamp per se is well known in the seat belt art, being utilized in the buckle of airplane type metal-to-webbing belt fasteners.

From the foregoing description it is apparent that if lock 40 is held open, the strap may be extended freely, and if lock 40 is permitted to close, extension of the strap will be prevented. Lock 40 permits retraction of the strap at all times, because the pivoting member 48 does not prevent retraction of the strap, turning slightly against the bias of spring 52 so as to permit the strap to be retracted even when the pivoting member 48 has been moved to the position shown in FIGURE 5. This action is facilitated by contouring the teeth or corrugations of the clamping surface so that they are inclined rearwardly for ready engagement with the strap when the strap is extended but to minimize engagement when the strap is retracted.

Figure 3:
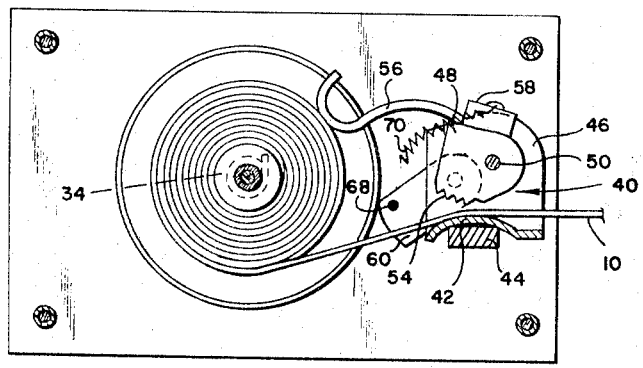
FIGURE 3 is a sectional view taken along line 3—3 of FIGURE 2.
Figure 4:
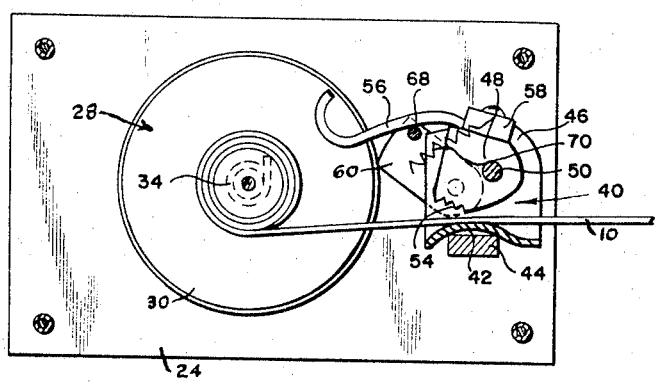
FIGURE 4 is a similar sectional view illustrating a different condition of the apparatus.

When the strap 10 is unbuckled from strap 22 and rewound to its fully retracted condition, it is desired that the extension-preventing means 40 be rendered inoperative, so that strap 10 may be freely extended again when needed. For this purpose a mechanism is provided to determine when the strap has been retracted to a predetermined retracted condition, e.g., fully retracted. In the form shown this mechanism comprises feeler member 56 having a lever arm extending from the pivoting lock member 48, being secured to the top thereof by a small block 58 so as to constitute a section of member 48. It will be seen that when the reel has turned in a strap retracting direction a sufficient number of revolutions to retract the strap substantially fully, the strap wound thereon engages the free end of the feeler and lifts the feeler so as to turn the pivoting member 48 to render the extension-preventing means 40 inoperative as shown in FIGURE 3. When the strap is extended from the reel, the feeler loses contact with the strap, as shown in FIGURE 5, and the extension-preventing means is permitted to operate. The feeler may be shaped so as to engage the strap wound upon the reel within a predetermined range of wound strap.

Member 56 renders the extension-preventing means inoperative when the strap has been fully rewound, to permit initial extension of the strap, but will not maintain the extension-preventing means inoperative after initial extension of the strap. In order to maintain the extension-preventing means inoperative during extension of the strap to the desired length, another mechanism is employed. This mechanism comprises means frictionally driven by the reel through a limited angular range (substantially less than 360°) and in the form shown comprises one or more sector elements 60, 62 driven by the reel. These reel-driven elements are pivotally supported by stub shafts 64 upon the side plates of the frame and frictionally engage the periphery of the end discs of the reel, which may be provided with rubber O-rings 66 preferably seated in grooves on the peripheral surface of the end discs. The reel-driven elements 60, 62 may be connected by a pin 68, so that they move in unison and are provided with a tension bias spring 70 for urging them into engagement with the end discs. One end of the spring may be connected by a screw to the top of one reel-driven element and the other end may be connected by a screw to the block 58.

When the strap is being extended, the reel rotates (counter-clockwise as viewed in FIGURE 4) and turns reel-driven elements 60, 62 through a limited angular range in one direction to a first position (FIGURE 4), at which pin 68 engages the underside of member 56 and serves as an abutment or support for maintaining pivoting lock element 48 away from cooperating lock element 42. The extension-preventing means or lock 40 is thus maintained inoperative during desired extension of strap 10. When reel-driven elements 60, 62 reach the position of FIGURE 4, they remain in slipping contact with the end discs of the reel, which turn past them. Thus each reel-driven element and its end disc constitute a coupling having a pair of parts, one of which is driven positively through a limited range and then slips relative to the other.

The strap is extended to approximately the desired length, and the tongue 14 (FIGURE 1) is engaged with the buckle 18. In so doing it is almost impossible to avoid extending the strap slightly more than the length required when the tongue and buckle are laid snugly against the user's body. Thus, after the tongue is engaged with the buckle, strap 10 retracts slightly, the reel turning slightly in a strap retracting direction (clockwise as viewed in FIGURE 5). When this occurs, the reel-driven elements 60, 62 turn through their limited angular range in the opposite direction to a second position (FIG- URE 5). The support 68 thus is disengaged from the pivoting lock member 48, permitting this member to turn toward lock member 42 under the bias of spring 52 and thus rendering the strap extension-preventing means operative to prevent further extension of the strap. As shown in FIGURE 5, the reel-driven elements may, if desired, actually lose contact with the reel by a slight amount and come to rest upon the supporting bar 44, the tension in bias spring 70 being reduced at this time. Thus, in a collision, even if the strap were to slip slightly through the clamp before the lock engaged firmly, there would be no possibility of the reel-driven element being driven by the reel to open the lock.

If now the tongue is disengaged from the buckle, the reel will retract the strap, the clamp-lock normally permitting retraction, but not extension of the strap. Eventually the feeler 56 engages the strap as shown in FIGURE 3, turning the pivoting lock member 48 clockwise in that figure to render the extension-preventing means inoperative. When the strap is extended again, the reel-driven elements 60, 62 are again driven to the position of FIGURE 4.

Figure 6:
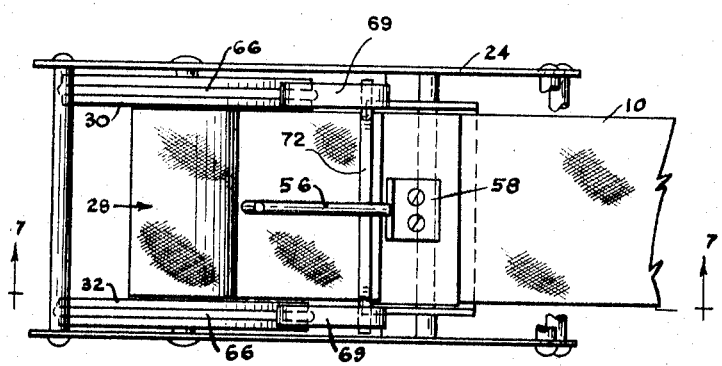
FIGURE 6 is a plan view of a modification of the apparatus of FIGURE 2.
Figure 7:
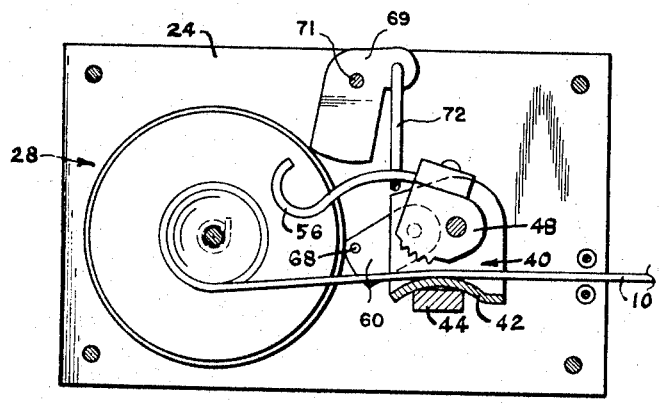
FIGURE 7 is a sectional view taken along line 7—7 of FIGURE 6.
Figure 8:
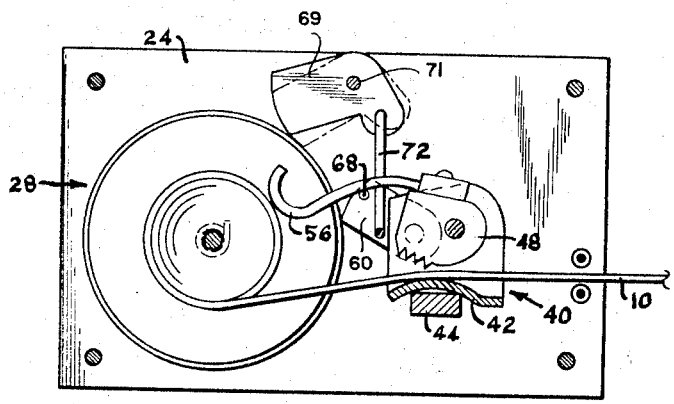
FIGURE 8 is a similar sectional view illustrating another condition of the modified apparatus.

FIGURES 6–8 illustrate a modification in which the pivoting member 48 of the extension-preventing means is moved away from the cooperating member 42 during substantial rewinding of the strap upon the reel in order to enhance retraction. As shown, this may be accomplished by providing reel-driven means, such as sectors 69 frictionally driven by the end discs of the reel through a limited angular range (substantially less than 360 degrees). These reel-driven elements are supported on stub shafts 71 from the side plates of the frame and have a lifter or bail 72 pivotally suspended therefrom at the side of the stub shafts remote from the reel. While the strap is being extended, elements 69 are driven in one direction to the full line position of FIGURE 8, the end discs slipping past them, and there is substantial space between the lifter 72 and member 56. The extension-preventing means is held inoperative by reel-driven elements 60, 62 as stated above. The slight retracting movement of the strap and reel required to permit member 48 to turn to its operative position is not sufficient to engage the lifter 72 with member 56, the reel-driven elements 69 merely moving in the opposite direction to the phantom line position in FIGURE 8 during such slight retraction of the strap. However, further retracting movement of the strap and reel drives elements 69 to the position (FIGURE 7) at which the lifter engages member 56 and turns pivoting lock member 48 away from lock member 42 enough to open the lock 40 wide and facilitate the retraction of the strap.

If the strap is permitted to retract sufficiently to engage the lifter 72 with member 56 and then is pulled again in an extending direction, the slight turning of the reel in the strap extending direction will disengage the lifter 72 from member 56 and permit the extension-preventing means to become operative instantly, under the influence of its bias spring 52, to prevent any further extension of the strap 10. The lifting movement of the lifter 72 may be made insufficient to create enough tension in bias spring 70 to engage elements 60 and 62 with the reel, if desired. The extent of turning movement of the reel-driven elements 60, 62, 69 may be controlled by varying their radii and/or by engaging the elements with different diameter portions of the reel; the end discs may be stepped down accordingly to provide shoulders for engaging the respective pairs of reel-driven elements.

The invention claimed is:

1. A retractable belt unit comprising a retraction reel, a strap connected to said reel for retraction and extension, said reel having means for moving said reel in a strap-retracting direction to retract said strap and being adapted to move in a strap-extending direction when said strap is extended, normally operative means for preventing extension of said strap, means for rendering said extension-preventing means inoperative when said reel has moved in the strap-retracting direction to retract said strap to a predetermined retracted condition, and reel-driven means moved by said reel in one direction to a first position during initial extension of said strap from said retracted condition for maintaining said extension-preventing means inoperative during extension of said strap to a desired length and thereafter moved by said reel in the opposite direction to a second position upon slight retracting movement of said reel for permitting said extension-preventing means to operate.

2. A retractable belt unit in accordance with claim 1, wherein said reel has an end disc and said reel-driven means comprises an element frictionally driven from said end disc and supported for turning movement in said one and said opposite directions.

3. A retractable belt unit in accordance with claim 2, wherein said element has means limiting its driven turning movement to an angular range substantially less than 360 degrees and is constructed to permit said end disc to slip past said element after said element has been driven through said limited angular range.

4. A retractable belt unit in accordance with claim 3, said element having spring means biasing said element into engagement with said end disc.

5. A retractable belt unit in accordance with claim 1, said extension-preventing means comprising a pair of cooperating lock members, one of which is pivotable toward and away from the other, said means for rendering said extension-preventing means inoperative comprising means for turning said one member away from the other member, said means for maintaining said extension-preventing means inoperative comprising an abutment fixed to said reel-driven means for engaging a section of said pivotable member when said reel-driven means is moved to said first position.

6. A retractable belt unit in accordance with claim 5, wherein said pivotable member has spring means for biasing it toward said other member.

7. A retractable belt unit in accordance with claim 5, further comprising means driven by said reel in a first direction during retraction of said strap for turning said pivotable member away from said other member in response to further retracting movement of said reel beyond said slight retracting movement and driven by said reel in a second direction during extension of said strap for permitting said pivotable member to turn toward said other member.

8. A retractable belt unit in accordance with claim 7, wherein the last-mentioned means is supported for turning movement and is frictionally driven from said reel through a limited angular range substantially less than 360 degrees.

9. A retractable belt unit in accordance with claim 8, wherein the last-mentioned means has a lifter engaging a section of said pivotable member during said further retracting movement.

10. A retractable belt unit in accordance with claim 1, wherein said extension-preventing means comprises a strap clamp.

11. A retractable belt unit comprising a retraction reel, a strap connected to said reel for retraction and extension, said reel having means for moving said reel in a strap-retracting direction to retract said strap and being adapted to move in a strap-extending direction when said strap is extended, lock means including a pair of relatively movable cooperating members for preventing extension of said strap when one of said members is close to the other member but for permitting said strap to be retracted, means for moving said members apart when said strap is substantially fully retracted, means for holding said members apart during extension of said strap following substantially full retraction and for permitting said members to move close together in response to slight retracting movement of said reel thereafter, and reel-driven means for moving said members apart again in response to further retracting movement of said reel.

12. A retractable belt unit in accordance with claim 11, wherein the last-mentioned means is frictionally driven from said reel.

13. A retractable belt unit in accordance with claim 12, wherein the last-mentioned means is driven by said reel in one direction to a first position during extension of said strap and in the opposite direction to a second position during retraction of said strap.

14. A retractable belt unit in accordance with claim 13, wherein the last-mentioned means is driven by said reel through a limited angular range substantially less than 360 degrees and has a lifter movable into engagement with a section of one of said members during said further retracting movement for moving said one member away from the other member.

15. A retractable belt unit comprising a retraction reel, a strap connected to said reel for retraction and extension, said reel having means for moving said reel in a strap-retracting direction to retract said strap and being adapted to move in a strap-extending direction when said strap is extended, normally operative means for preventing extension of said strap, means for rendering said extension-preventing means inoperative when said reel has moved in the strap-retracting direction to retract said strap to a predetermined retracted condition, and reel-driven means moved by said reel in one direction to a first position during initial extension of said strap from said retracted condition for maintaining said extension-preventing means inoperative during extension of said strap to a desired length and thereafter moved by said reel in the opposite direction to a second position upon slight retracting movement of said reel for permitting said extension-preventing means to operate, said reel having an end disc and said reel-driven means comprising an element frictionally driven from said end disc and supported for turning movement in said one and said opposite directions, said element having means for limiting its driven movement to an angular range substantially less than 360 degrees and being constructed to permit said end disc to slip past said element after said element has been driven through said limited angular range, said element having spring means biasing said element into engagement with said end disc, said extension-preventing means comprising a pair of cooperating lock members one of which is pivotable toward and away from the other, said means for rendering said extension-preventing means inoperative comprising means for turning said pivotable member away from the other member, said means for maintaining said extension-preventing means inoperative comprising an abutment fixed to said reel-driven means for engaging a section of said pivotable member and holding said pivotable member away from said other member, said pivotable member having spring means for biasing it toward said other member.

16. A retractable belt unit in accordance with claim 15, further comprising means driven by said reel in a first direction during retraction of said strap for turning said pivotable member away from said other member in response to further retracting movement of said reel beyond said slight retracting movement and driven by said reel in a second direction during extension of said strap for permitting said pivotable member to turn toward said other member, the last-mentioned means being supported for turning movement and being frictionally driven from said reel through a limited angular range substantially less than 360 degrees and having a lifter engaging a section of said pivotable member during said further retracting movement.

17. A retractable belt unit comprising a retraction reel, a strap connected to said reel for retraction and extension, said reel having means for moving said reel in a strap-retracting direction to retract said strap and being adapted to move in a strap-extending direction when said strap is extended, normally operative means for preventing extension of said strap, means for rendering said extension-preventing means inoperative when said reel has moved in the strap-retracting direction to retract said strap to a predetermined retracted condition, and means moved by said reel in one direction to a first position during initial extension of said strap from said retracted condition for maintaining said extension-preventing means inoperative during extension of said strap to a desired length and thereafter moved in the opposite direction to a second position for permitting said extension-preventing means to operate, said means moved by said reel being moved to said first position via a coupling having a pair of parts, one of which is driven positively through a limited range and then slips relative to the other.

18. A retractable belt unit in accordance with claim 17, wherein said coupling is a friction coupling and said driven part is constructed for driven turning movement limited to an angular range substantially less than 360 degrees.

19. A retractable belt unit comprising a retraction reel, a strap connected to said reel for retraction and extension, said reel having means for moving said reel in a strap-retracting direction to retract said strap and being adapted to move in a strap-extending direction when said strap is extended, lock means including a pair of relatively movable cooperating members for preventing extension of said strap when one of said members is close to the other member but for permitting said strap to be retracted, spring means normally biasing said one member toward said other member, means for moving said members apart when said strap is substantially fully retracted, means for holding said members apart during extension of said strap following substantially full retraction and for permitting said members to move close together in response to slight retracting movement of said reel thereafter, and means for moving said members apart again in response to further retracting movement of said reel.

20. A retractable belt unit comprising a retraction reel, a strap connected to said reel for retraction and extension, said reel having means for moving said reel in a strap-retracting direction to retract said strap and being adapted to move in a strap-extending direction when said strap is extended, lock means including a pair of relatively movable cooperating members for preventing extension of said strap when one of said members is close to the other member but for permitting said strap to be retracted, means normally biasing said one member toward said other member, means for moving said members apart when said strap is substantially fully retracted, means for holding said members apart during extension of said strap following substantially full retraction and thereafter for permitting said members to move close together, and means for moving said members apart again in response to retracting movement of said reel, the last-mentioned means comprising means driven from said reel via a coupling having a pair of parts, one of which is driven positively through a limited range and then slips relative to the other.

21. A retractable belt unit in accordance with claim 20, wherein said coupling is a friction coupling and said driven part is constructed for driven turning movement limited to an angular range substantially less than 360 degrees.

References Cited

UNITED STATES PATENTS

| | | | |
|---|---|---|---|
| 3,100,669 | 8/1963 | Monroe | 297—388 |
| 3,174,704 | 3/1965 | Replogle | 242—107.4 |
| 3,193,327 | 7/1965 | Roe | 297—388 |

WILLIAM S. BURDEN, *Primary Examiner.*